US006676325B2

(12) United States Patent
Schmidt et al.

(10) Patent No.: US 6,676,325 B2
(45) Date of Patent: Jan. 13, 2004

(54) AUTOMOTIVE STEERING COMPLIANT PIVOT SOCKET WITH TAPERED HEAD

(75) Inventors: George R. Schmidt, St. Louis, MO (US); Dale Spence, St. Louis, MO (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 64 days.

(21) Appl. No.: 10/145,683

(22) Filed: May 15, 2002

(65) Prior Publication Data

US 2002/0127048 A1 Sep. 12, 2002

Related U.S. Application Data

(63) Continuation-in-part of application No. 09/566,288, filed on May 5, 2000.

(51) Int. Cl.$^7$ ................................................ F16C 11/06
(52) U.S. Cl. ...................... 403/120; 403/135; 403/133; 403/144
(58) Field of Search ............................... 403/120, 122, 403/137, 135, 132, 133, 145, 144, 146

(56) References Cited

U.S. PATENT DOCUMENTS

| 2,846,251 A | 8/1958 | Herbenar |
| 3,245,706 A | 4/1966 | Rowlett |
| 3,561,800 A | 2/1971 | Hassan |
| 3,790,195 A | 2/1974 | Herbenar |
| 3,945,737 A | 3/1976 | Herbenar |
| 4,154,544 A | * 5/1979 | Gair ............................ 403/59 |
| 5,509,749 A | * 4/1996 | Eifert et al. ................. 403/144 |
| 5,597,258 A | 1/1997 | Kincaid et al. |
| 6,099,192 A | 8/2000 | Free |
| 6,505,989 B1 | * 1/2003 | Pazdirek et al. ............ 403/135 |

* cited by examiner

Primary Examiner—John R. Cottingham
(74) Attorney, Agent, or Firm—Polster, Lieder, Woodruff & Lucchesi, L.C.

(57) ABSTRACT

A pivot socket of the present invention incorporates a stud shaft component having a tapered head portion disposed within a housing cavity, and an axial pin extension extending upward into the cavity therefrom. The tapered head portion seats against a tapered bearing surface disposed within the housing cavity, and the axial pin extension is enclosed within a resilient bushing. During use, lateral and axial loads imparted on the stud shaft are transformed into radial and axial component forces at the bearing surfaces. Angulation loads are resisted by the tapered head portion, and converted to axial forces. The radial force components are distributed to the interior walls of the housing cavity, while the axial force components are transferred axially through the resilient bushing to the end closure components secured to the housing, or directly to the housing through the tapered bearing surface. Little or no lateral force components are transferred to the resilient bushing from lateral loads imparted on the stud shaft, thereby reducing wear on the pivot socket components and extending the useful life thereof.

13 Claims, 3 Drawing Sheets

AUTOMOTIVE STEERING COMPLIANT PIVOT SOCKET WITH TAPERED HEAD

CROSS-REFERENCE TO RELATED APPLICATIONS

This application is a continuation-in-part of U.S. patent application Ser. No. 09/566,288, filed on May 5, 2000 from which priority is claimed.

STATEMENT REGARDING FEDERALLY SPONSORED RESEARCH

Not Applicable.

BACKGROUND OF THE INVENTION

This invention relates to the design of movable sockets, for example, socket joints as used in automotive steering and suspension systems, and more particularly, to a movable socket configured with a tapered bearing surface and a projecting pin stud restrained within an elastomeric or spring-centered compliance bearing. The movable socket of the present invention is additionally configured to have increased durability under conditions of high load and misalignment and to be assembled using conventional techniques. While the present invention is described in detail with respect to automotive applications, those skilled in the art will recognize the broader applicability of the invention.

Conventional socket joints, and other movable sockets are used, for example, in automotive steering and suspension applications. The sockets comprise a housing having a circular cylindrical internal surface, a ball stud with a part-spherical ball head contained in the housing, and a synthetic resin or sintered alloy bearing member supporting the ball head within the housing. These components are commonly installed into the housing through a posterior opening, with the ball stud extending outward through an axially disposed anterior opening of a smaller diameter than the ball head. Traditionally, the posterior opening is closed by means of a cover-plate, spun, swaged, or welded in place. Once secured in place, the cover-plate presses on the bearing member either directly or indirectly through a resilient rubber intermediate component.

Several ball joint designs incorporating a projecting pin from the upper surface of the ball stud are shown in the prior art. These designs are intended to limit angular movement of the stud relative to the housing in which it is contained.

U.S. Pat. No. 3,790,195 issued to Edward J. Herbenar on Feb. 5, 1974 discloses a preloaded socket joint for an automotive steering linkage. The '195 socket joint is primarily for rotational movement with a stud projecting from an internal cavity housing and having a part-spherical bulged section received in the housing and seated against a spherical face seat adjacent the projecting point of the stud from the housing. The stud further includes an axial extension beyond the half sphere within the housing which is received in a bearing with a resilient member entrapped between the wall of the cavity and the bushing. The opposite end of the housing cavity from the point of projection is closed by a cap which applies a preload to the axial end of the stud within the cavity and to the resilient member. As can be seen in FIG. 1 of the '195 patent, all axial loads on the stud are transferred either directly through the stud itself to the cap which closes the housing, or through the bushing and resilient member to the cap.

U.S. Pat. No. 3,945,737 issued on Mar. 23, 1976, also to Edward J. Herbenar discloses a modification of the socket joint shown in the '195 patent. The '737 pivot joint provides a housing with a hemi-spherical bearing seat at one end thereof, a recessed closure cap secured in the other end thereof, and a stud having a shank projecting freely into the housing with a head tiltable on the seat. The stud further includes a tapered pin depending from the hemi-spherical head and bottomed directly on the closure plate together with an axially split rubber bushing surrounding the pin and snugly seated in the housing. A wear take-up member between the closure plate and the bushing urges the bushing toward the hemi-spherical head of the stud, and a ring surrounding the recess of the closure plate limits the tilting of the stud on the bearing seat. In this design, the compressive loads of the stud and the angulation loads of the stud are taken by the same member, i.e. the axially split, resilient bushing with a tapered bore. Thus, the design inhibits freedom in selecting an axial preload independently of angulation considerations and vice-versa.

U.S. Pat. No. 5,597,258 issued to Kincaid et al. on Jan. 28, 1997 discloses a preloaded pivot joint with a stud capable of rotation and angulation. The preloaded pivot joint is designed such that different internal components transfer the respective lateral loads, axial compression loads, and angulation loads experienced by the stud. Specifically, as seen in FIG. 1 of the '258 patent, the stud incorporates a hemi-spherical portion for transferring lateral loads to a fixed bearing seat within the stud housing, a concentric convex tip for transferring compressive (axial) loads directly to a spring biased bearing seat, and a cylindrical extension between the hemi-spherical portion and the convex tip for radially transferring angulation loads to a hardened cylindrical metal ring of a resilient composite bushing.

Each of these prior art pivot sockets includes compliance components formed of a resilient material such as rubber, polyurethane, and the like, which surrounds a pin portion projecting from the hemi-spherical head of the stud and which transfers some form of loading from the stud to the housing.

Accordingly, it is highly advantageous to develop a preloaded pivot joint wherein a single compliance component transfers both axial and angulation loads to either the housing walls, the bearing surface, or the end closure components. The compliance component acts in conjunction with a tapered socket head to limit the movement of the stud, but does not carry lateral loads, reducing wear on the pivot socket components and extending the useful life thereof. Such a design provides freedom in selecting an axial preload independently of stud angulation considerations.

BRIEF SUMMARY OF THE INVENTION

Briefly stated, a pivot socket of the present invention incorporates a stud shaft component having a tapered head portion disposed within a housing cavity, and an axial pin extension extending upward into the housing cavity. The tapered head portion is seated against a lower tapered bearing surface disposed within the housing cavity, and the axial pin extension is enclosed within a resilient bushing. During use, lateral or axial loads imparted on the stud shaft are transformed into radial and axial component forces at the bearing surface. The radial component forces are transferred primarily to the interior walls of the housing cavity, while the axial force components are transferred axially through the resilient bushing to the end closure components secured to the housing. The tapered head portion acts to resist angular displacement (rocking) of the stud by requiring that the stud lift within the housing, thereby resisting rocking movement but maintaining stud centering. The tapered head portion further acts to convert angular loads into axial loads which are transferred axially through the resilient bushing to the end closure components. Little or no radial force components are transferred to the resilient bushing from lateral or axial loads imparted on the stud shaft, reducing wear on the pivot socket components and extending the useful life thereof, The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
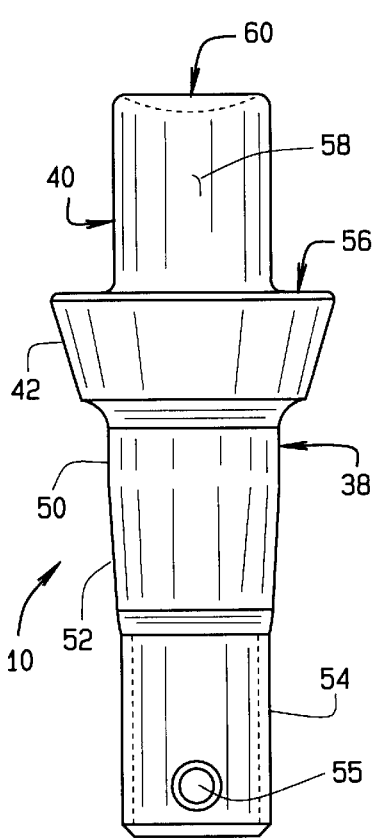
FIG. 1 is a view of the stud design of the present invention, illustrating a tapered head configuration.
Figure 2:
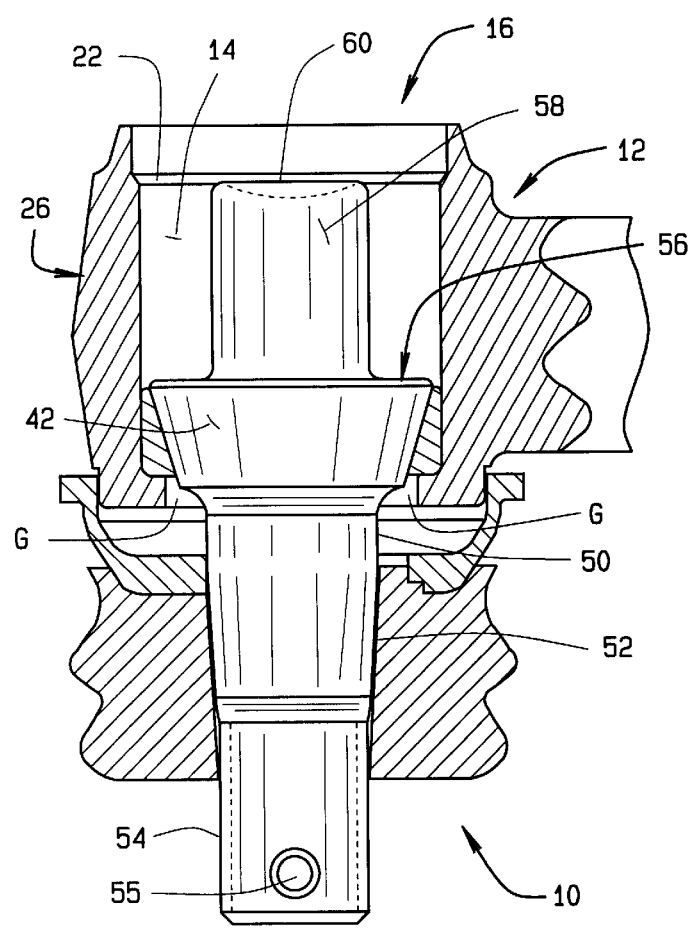
FIG. 2 is a sectional view of an embodiment of the preloaded pivot socket of the present invention, utilizing the stud of FIG. 1 and an elastomeric bushing resilient member.
Figure 3:
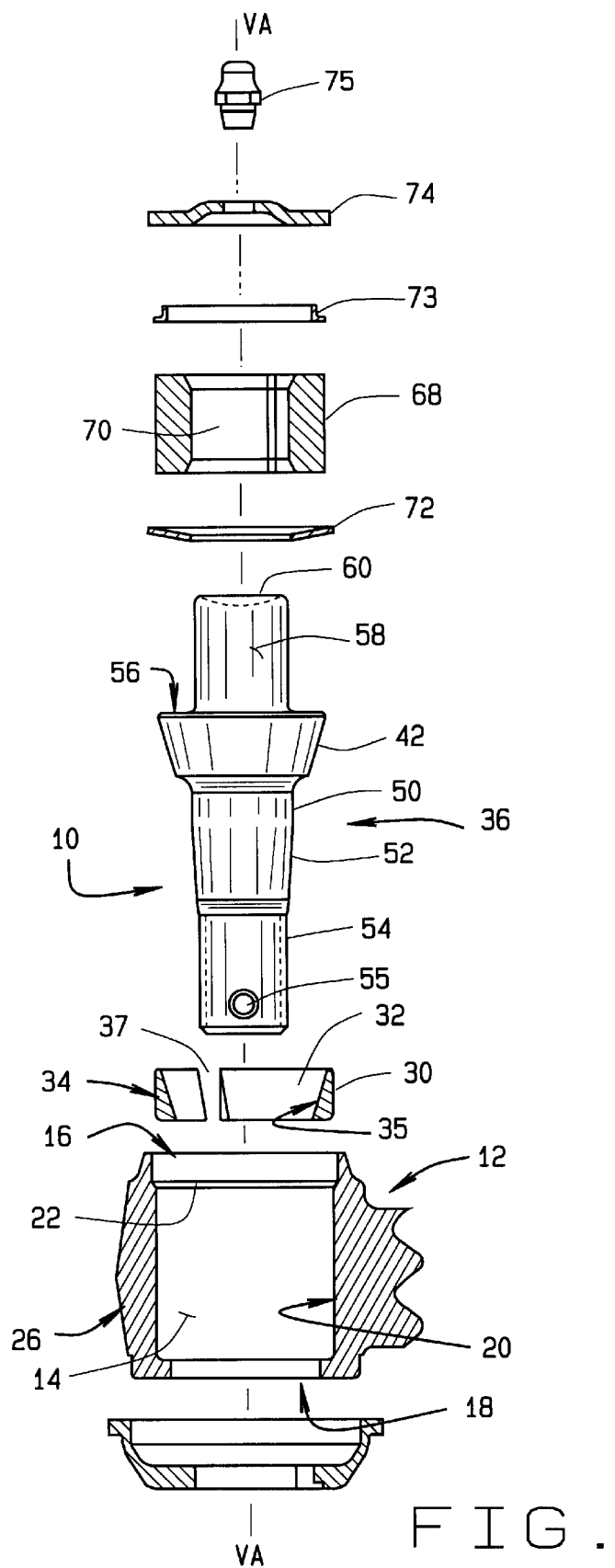
FIG. 3 is an exploded view of the preloaded pivot socket of FIG. 2 including additional components to close the socket.

Turning to FIGS. 1–3, an embodiment of the pivot joint of the present invention is shown generally at 10. The pivot joint includes a housing 12, within which the various internal components of the pivot joint are enclosed. Housing 12 is generally cylindrical, with a central bore 14 of uniform radius having a posterior opening 16 and an anterior opening 18. Optionally, a circumferential groove 22 is formed in bore 14, adjacent the posterior opening 16, for use with conventional methods for closing the housing 12. The exterior surface 26 of housing 12 may follow the general contour of the central bore 14.

To assemble ball joint 10, a lower bearing 30 sized to fit within central bore 14 is seated within housing 12. The lower bearing 30 includes a conical central bore 32 axially aligned with a vertical axis VA of the housing, and an outer surface 34 of bearing 30 is designed to correspond to the interior surface 20 in housing 12. The inner surface 35 of the lower bearing 30 is formed in a tapered or conical shape to receive a stud 36, and may include one or more crenellations or breaks 37 to facilitate expansion and contraction.

Stud 36 has a generally cylindrical body 38 and a conical or tapered head portion 42. To assemble the pivot joint, the lower end of the cylindrical body 38 is passed through central bores 32 and 14, such that the lower conical or tapered surface 42 of the head portion 40 rests on an inner conical or tapered bearing surface 35 of lower bearing 30 seated within housing 12. The body 38 may include a uniform diameter upper portion 50, adjacent head portion 40, a tapered central portion 52, and a lower portion 54 of a narrow uniform diameter. A passage 55 through the lower portion 54 allows for the connection of additional components (not shown) thereto. Those of ordinary skill in the art will recognize that the portions of the body 38 extending from the housing 12 may be altered or adapted as required, without changing the scope of this invention, depending upon the particular application within which the ball joint 10 is to be utilized.

The upper portion 50 is sized to fit within the central bore 32 of bearing 30, with the central portion 52 and lower portion 54 extending through the anterior opening 18, externally of housing 12. It will be noted that there is a gap G of predetermined width between the anterior opening 18 and the upper portion 50. This gap G or clearance permits conical and rotational movement of head portion 40 with respect to housing 12 with a predetermined limited range of movement.

When assembled, the upper surface 56 and the lower conical or tapered surface 42 define a generally conical bearing unit within housing 12 which permits the aforesaid movement of the stud 36.

Figure 4:
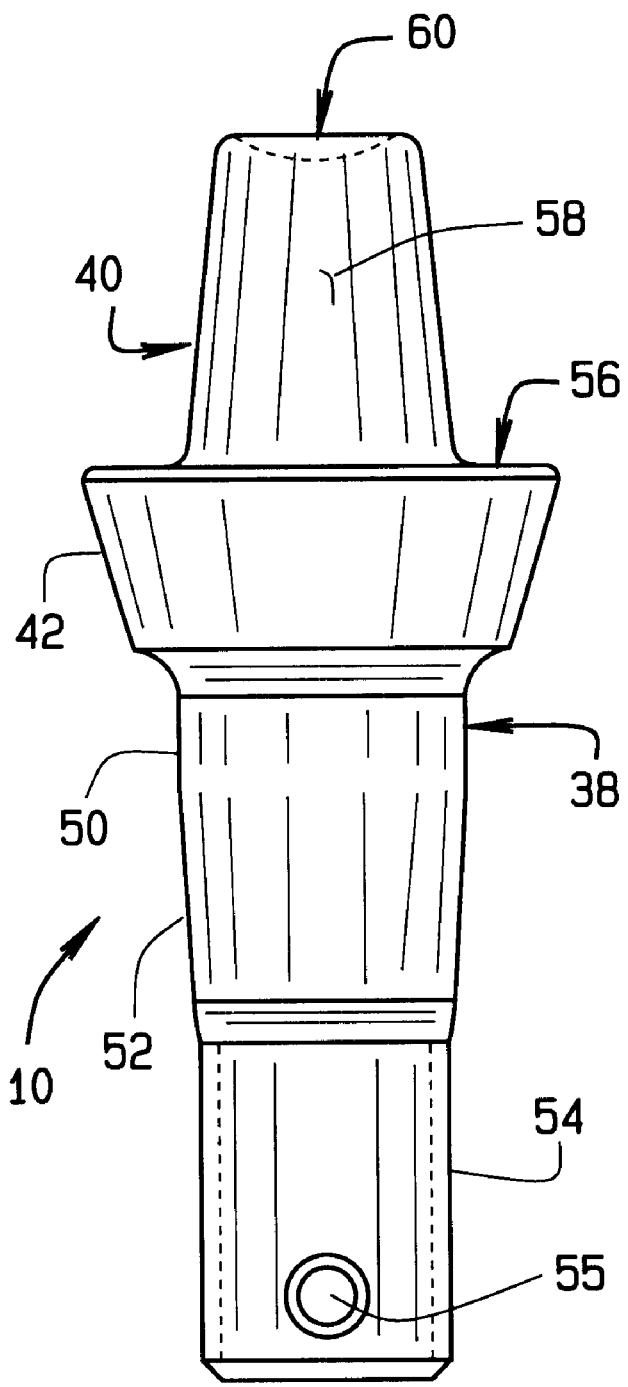
FIG. 4 is a view of an alternate stud design for the present invention, illustrating a conical pin configuration.

Projecting axially upward from the upper surface 56 of stud 36 is an elongated cylindrical axial extension or pin portion 58 coaxial with stud. The length of the elongated pin portion 58 is selected such that the face 60 of the elongated pin portion is disposed below the circumferential groove 22 in the housing 12. Those skilled in the art will readily recognize that the numerous size configurations for the stud 36, the head portion 40, and the elongated pin portion 58 are possible, and will depend upon the particular application for which the pivot joint is utilized. For example, as is shown in FIG. 4, the elongated pin portion 58 may be configured frustoconically, in the form of a truncated cone, to provide a self-centering nature to the stud 36 in response to rocking movement.

In the embodiment shown in FIG. 3, a shaped resilient member 68, preferably an elongated elastomeric bushing, having a central bore 70 sized to fit around the pin portion 58 of the stud 36 by interference fit or sliding fit is seated against a Belleville washer 72, which rests against the upper surface 56 of stud 36. Alternatively, the elongated elastomeric bushing 68 seats directly against the upper surface 56 of the stud 36. The resilient member or elastomeric bushing 68 is preferably composed of a resilient material such as nylon or braided metal such as a compressed braided wire mesh, capable of transmitting force with limited compliance. The elongated elastomeric bushing 68 may optionally be isolated from the pin portion by means of a steel sleeve (not shown). A Belleville washer 72 is disposed between the upper surface 56 and the elongated elastomeric bushing 68. The outer diameter of the elongated elastomeric bushing 68 is sized to fit within the central bore 14, contacting the housing 12 and to extend approximately the height of the circumferential groove 22. A telescoping spacer 73 is optionally positioned above the elongated elastomeric bushing 68.

In one embodiment, to enclose the installed components within the housing 12, an end closure cap 74 is installed within the circumferential groove 22 to close the posterior opening 16, partially compressing the telescoping spacer 73, if present, and elongated elastomeric bushing 68.

In alternative embodiments, the end closure cap 74 may be retained within the housing 12 by any conventional means such as welding, spinning, or swaging of the end closure cap 74 or housing 12, and may contain an axially disposed grease fitting 75.

The compression of the elongated elastomeric bushing 68 or Belleville washer 72 provides a resilient preload force downward from the end closure cap 74 and onto the upper surface 56 of stud 36. The head portion 40 of the stud 36 in turn, transfers the force axially to the lower bearing 30 and to the housing 12. This preload force takes up any dimensional slop in the manner in which stud 36 is seated in the bearing 30 and bushing 68.

In this configuration, when a lateral force is applied to the portions of the stud 36 which projects from housing 12, the force is transferred radially into the lower bearing 30. Due to the conical or tapered shape of the inner surface of the bearing 30, and the conical or tapered configuration of the head or ball portion 40 of stud 36, a portion of the radially transferred force is directed outward against the housing 12, and a portion of the force is directed axially upward into the elongated elastomeric bushing 68 and axially downward through the bearing 30.

The axially downward force is received in the lower portions of the housing 12 against which the bearing 30 is seated. Correspondingly, the component of the lateral force on the stud 36 which is directed axially upward is transferred through the elongated elastomeric bushing 68 to the end closure cap 74 and the housing 12.

In the event a direct axial load is applied to stud 36, it will similarly be transferred to elongated elastomeric bushing 68 and end closure cap 74 or directly to the lower portion of the housing through the tapered bearing 30. Only when angulation loads are applied to stud 36, resulting in a rocking movement of the head portion 40 about a central pivot point will the elongated elastomeric bushing 68 experience axial and radial forces transmitted through the head and pin portions 56, 58. Due to the conical or tapered shape of the inner surface of the bearing 30, and the conical or tapered configuration of the head or ball portion 40 of stud 36, rocking movement the stud 36 is partially converted into a lifting or axial movement, which is transferred through the components as described above. The remaining radial forces from the rocking movement of the stud 36 are countered by the resilient nature of the elongated elastomeric bushing 68, resisting the rocking movement of the head portion 40, and urging the stud 36 to return to an axially centered position. By isolating the elongated elastomeric bushing 68 from radial forces due to axial and lateral loads on stud 36, the wear on bushing 68 is reduced.

In view of the above, it will be seen that the several objects of the invention are achieved and other advantageous results are obtained. Embodiments are shown wherein the internal components of a pivot joint surrounding a conical or tapered head portion of the stud transfer lateral and axial forces exerted on the stud axially to the end closure cap of the housing through internal components other than the stud itself. Simultaneously, these internal components are capable of providing a radial resistance to angulation forces applied to the stud and transferred to the components through a pin projection on the upper end of the stud within the housing. As various changes could be made in the above constructions without departing from the scope of the invention, it is intended that all matter contained in the above description or shown in the accompanying drawings shall be interpreted as illustrative and not in a limiting sense.

What is claimed is:

1. A preloaded pivot joint assembly comprising:
   a housing having an axis;
   a stud having a lower frustoconical head portion and a flat radial upper surface retained within the housing, a shaft portion projecting axially from the housing, and an elongated pin portion projecting axially from said flat radial upper surface within the housing;
   a tapered bearing surface, said tapered bearing retained within the housing and enclosing a portion of said lower frustoconical head portion; and
   a resilient member disposed within said housing, said resilient member biasing against said flat radial upper surface of said stud to accommodate axial forces therefrom, said resilient member further biasing against said elongated cylindrical pin portion to accommodate radial forces therefrom.

2. The preloaded pivot joint assembly of claim 1 wherein said resilient member is an elongated elastomeric bushing.

3. The preloaded pivot joint assembly of claim 2 wherein said elongated elastomeric bushing is sized for an interference fit between said housing and said elongated pin portion of said stud.

4. The preloaded pivot joint assembly of claim 1 further including an annular preload member disposed between said resilient member and said biased flat radial surface of said stud.

5. The preloaded pivot joint assembly of claim 1 wherein said elongated pin portion of said stud is cylindrical.

6. The preloaded pivot joint assembly of claim 1 wherein said elongated pin portion of said stud is frustoconical.

7. A preloaded pivot joint assembly comprising:
   a housing having an axis and a surface defining a bore about said axis;
   a cap secured to said housing, said cap configured to enclose one end of said bore;
   a stud having a lower frustoconical head portion and a flat radial upper surface retained within the housing bore, a shaft portion projecting axially from said housing opposite said cap, and an elongated pin portion projecting axially from said flat radial upper surface within said housing bore, said elongated pin portion in spaced relationship to said housing surface and said cap;
   a tapered bearing surface, said tapered bearing surface retained within the housing bore and enclosing a portion of said lower tapered head portion; and
   a resilient member disposed about said elongated pin portion, said resilient member adapted to transfer axial loads from said flat radial upper surface of said stud to said cap, and to transfer radial loads from said elongated pin portion to said housing surface.

8. The preloaded pivot joint assembly of claim 7 further including at least one annular preload member disposed between said resilient member and said flat radial surface of said stud.

9. The preloaded pivot joint assembly of claim 7 further including one or more annular spacer members disposed between said resilient member and said flat radial surface of said stud.

10. The preloaded pivot joint assembly of claim 7 further including one or more annular spacer members disposed between said resilient member and said cap.

11. The preloaded pivot joint assembly of claim 7 wherein said elongated pin portion of said stud is cylindrical.

12. The preloaded pivot joint assembly of claim 7 wherein said elongated pin portion of said stud is frustoconical.

13. The preloaded pivot joint assembly of claim 7 wherein said resilient member is composed of a compressed braided wire mesh.

* * * * *